Jan. 5, 1937.  C. PEARSON  2,066,483
BICYCLE TIRE BEAD WIRES AND METHOD FOR THEIR MANUFACTURE
Filed April 18, 1935
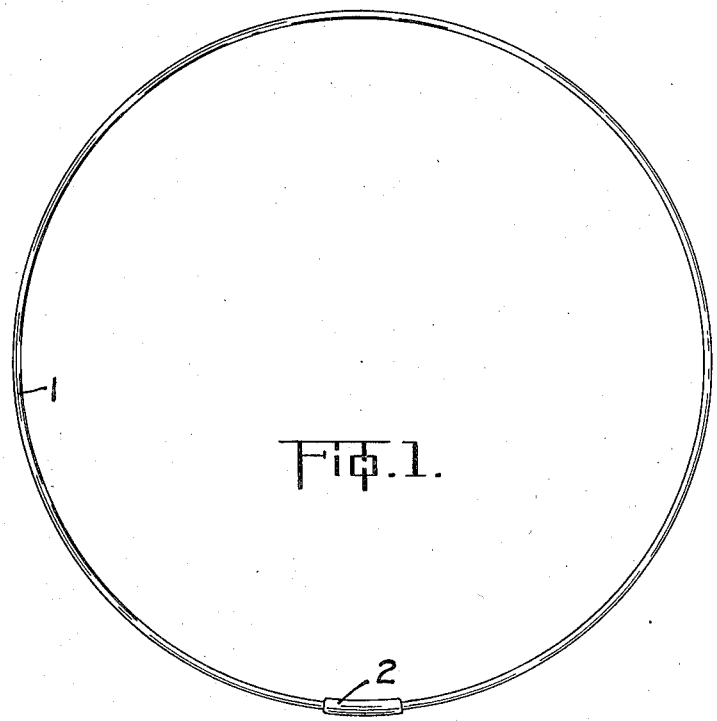
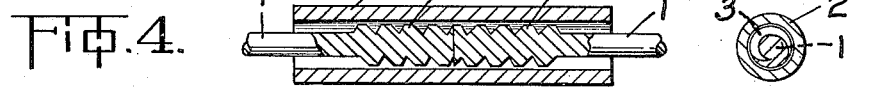
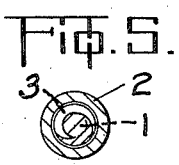
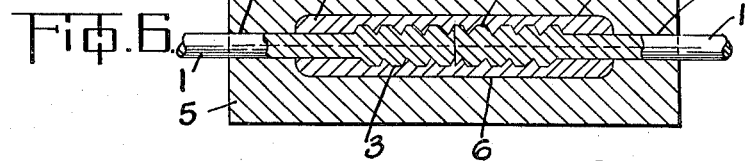
Inventor
C. PEARSON
By J.E.M. Fetherstonhaugh
Attorney Patented Jan. 5, 1937

2,066,483

UNITED STATES PATENT OFFICE 2,066,483

BICYCLE TIRE BEAD WIRES AND METHOD FOR THEIR MANUFACTURE

Charles Pearson, Ingersoll, Ontario, Canada, assignor to Morrow Screw and Nut Company Limited, Ingersoll, Ontario, Canada, a company of Ontario, Canada Application April 18, 1935, Serial No. 17,147 In Canada May 22, 1934

2 Claims. (Cl. 245—1.5)

My invention relates to improvements in bicycle tire bead wires and methods for their manufacture of the kind in which the bead wire has its ends joined together to form a closed loop which is embedded in the fabric of the tire bead, and the object of the present invention is to devise a joint for the ends of the bead wire without the application of heat and which will not impair the tensile strength of the wire loop.

A further object is to devise a joint which can be formed with facility.

Hitherto, in forming bead wires of the closed loop kind, it has been the practice to employ a longitudinally split nipple on the ends of the bead wire and to braze such nipple thereto. The brazing operation anneals the wire in the vicinity of the ends and thus impairs its tensile strength, or in other words makes the tensile strength of such wire in the vicinity of the joint less than that of the remainder of the wire with the result that the wire has a tendency to fracture at such weakened points. In my construction, as no heat is applied, the wire is not annealed and consequently its tensile strength is not reduced at any point.

With the above and other objects in view which will hereinafter appear as the description proceeds, my invention consists, in its preferred embodiment, of the construction, arrangement and method of manufacture, all as hereinafter more particularly described and illustrated in the accompanying drawing in which:—

Fig. 1 represents a side view of the complete bead wire loop and its joint.

Fig. 2 is an enlarged side view of the separated ends of the bead wire loop.

Fig. 3 is a similar view to Fig. 2 showing the first step in the method of manufacture which consists in rolling a thread on each end of the loop.

Fig. 4 is an enlarged sectional view through the threaded ends of the loop showing them abutting each other and a nipple applied thereover.

Fig. 5 is a cross-section of Fig. 4.

Fig. 6 is a sectional view showing the assembly of threaded loop ends with the nipple thereon inserted into a divided die which constricts the cross-setcional diameter of the nipple causing the material thereof to fill the spaces between the threads of the loop ends and to extend inwardly beyond such threads about the adjacent unthreaded portion of the loop ends, and Fig. 7 is an enlarged side view of the completed joint for the ends of the bead wire loop constructed according to my invention.

Like characters of reference indicate corresponding parts in the different views.

The bead wire loop 1, which preferably is composed of wire with a comparatively high carbon content, has its ends joined together without the application of heat by a nipple 2, preferably composed of steel with a less carbon content than the wire, and preferably of the seamless type.

In forming the joint for the bead wire ends, I first provide threads 3 on the ends of the wire. These threads are preferably rolled thereon in a roll threader or punch press by the employment of suitable roll threading dies. This roll threading operation increases the diameter of the ends as will be seen in Figs. 3 to 6. I then apply the tubular and preferably seamless nipple 2 thereover and bring the threaded ends of the wire together as is illustrated in Fig. 4.

Subsequently, I insert the threaded ends of the wire with the nipple 2 thereon between the portions 4 and 5 of a divided die and by pressure bring these portions together. The orifice 6 in the die is of less cross-sectional diameter than the initial diameter of the nipple with the result that, when the pressing operation is completed, the diameter of the nipple 2 is constricted, the material thereof being forced in between the threads of the threaded ends of the bead wire and extending beyond the threaded ends about the adjacent unthreaded portions of the wire making an exceedingly strong joint for the ends of the wire loop without the necessity of applying any heat whatsoever.

The ends of the orifice 6 in the die are preferably rounded which forms the ends of the nipple 2 into similar shape thus preventing there being any abrupt ends on the completed nipple which might have a tendency to damage the fabric of the bead in which the loop is embedded. These rounded ends in the orifice 6 also assist in forcing the metal of the nipple longitudinally inwardly so that the molecular structure of the same becomes closer. It is to be understood that the die also has concentric longitudinal end orifices 7 extending from the orifice 6 of the same diameter as the unthreaded portions of the wire which are received thereinto.

The tensile strength of a bead wire suitable for bicycle tires is usually in the neighbourhood of 950–1000 lbs. Where the nipple is brazed to the ends of the wire with a consequent annealing of the same, it is found by actual test that the tensile strength of the wire in the vicinity of the joint is only from 550–600 lbs. Thus as the tensile strength of the resultant loop can only be considered as that of its weakest point, such tensile strength is therefore reduced to the latter figure.

In forming the joint according to my invention without the employment of heat, it has been found by similar test that the tensile strength of the joint is very little less than that of the wire itself. Joints constructed according to my invention show by test that their tensile strength is 900-950 lbs. when that of the wire itself is 950-1000 lbs.

From the above description, it will be apparent that I have devised a joint for bicycle tire bead wires which will be substantially as strong as the wire itself.

As above described, to facilitate the pressing operation, I preferably make the material of the nipple somewhat softer than that of the wire.

Instead of threading the ends of the wire loop as above described, it would be within the scope of my invention to transversely serrate the ends by serrations preferably extending peripherally around the same.

What I claim as my invention is:

1. A method of forming a joint for the ends of bicycle tire bead wire loops wherein the wire thereof is of circular cross-section consisting in roll threading the ends of the wire loop whereby the diameter of such ends is increased with respect to the unthreaded portion around their entire cross-sectional circumferences which are retained in circular form, bringing the ends of the loop into abutting relation to each other, applying a nipple of circular cross-section both exteriorly and interiorly over such ends and by a die constricting the diameter of the nipple around its entire circumference so that the material thereof is forced into the spaces between the threads of the loop ends and caused to extend beyond the threaded ends to surround the adjacent unthreaded portions of the wire loop which are of lesser diameter than the threaded ends, said constricted nipple retaining its circular cross-sectional form.

2. In a joint for bicycle tire bead wire loops, the combination with the ends of the loop externally threaded and of greater diameter than the main portion of the wire loop around their entire cross-sectional circumferences, said ends being of circular cross-section and disposed in end to end abutting relation, of a seamless sleeve or nipple of circular cross-section both exteriorly and interiorly and of softer material than the wire loop applied over the abutting ends thereof and compressed into the spaces between the threads of such abutting ends of circular cross-section, and the ends of the sleeve surrounding and engaging the unthreaded portions of the wire loop of lesser diameter than its threaded ends immediately adjacent to such threaded ends.

CHARLES PEARSON.